United States Patent [19]

Baker et al.

[11] Patent Number: 5,500,889
[45] Date of Patent: Mar. 19, 1996

[54] METHOD AND APPARATUS FOR PRIORITIZING A TELEPHONE CALL ACCORDING TO A LEVEL OF SERVICE OF AN ORIGINATOR

[75] Inventors: Mark C. Baker, Lisle; William E. Hagerman, Naperville; Jack R. Penrod, Bolingbrook, all of Ill.; Nancy S. Stevens, Mount Laurel, N.J.

[73] Assignee: AT&T Corp., Murray Hill, N.J.

[21] Appl. No.: 257,619

[22] Filed: Jun. 9, 1994

[51] Int. Cl.[6] ........................................ H04M 7/00
[52] U.S. Cl. .................... 379/67; 379/243; 379/112; 379/142; 379/220; 379/207
[58] Field of Search .................. 379/34, 112, 113, 379/127, 137, 138, 139, 142, 207, 208, 220, 221, 279, 243, 244

[56] References Cited

U.S. PATENT DOCUMENTS

| | | | |
|---|---|---|---|
| 3,796,837 | 3/1974 | Mathews | 379/197 |
| 4,224,479 | 9/1980 | Crawford | 379/196 |
| 4,497,978 | 2/1985 | Schoute et al. | 379/279 |
| 4,757,529 | 7/1988 | Glapa et al. | 379/214 |
| 4,907,256 | 3/1990 | Higuchi et al. | 379/137 |
| 5,067,074 | 11/1991 | Farel et al. | 379/113 |
| 5,068,892 | 11/1991 | Livanos | 379/221 |
| 5,086,460 | 2/1992 | Ash et al. | 379/221 |
| 5,226,075 | 6/1993 | Funk et al. | 379/243 |
| 5,291,550 | 3/1994 | Levy et al. | 379/242 |
| 5,325,426 | 6/1994 | Held | 379/243 |
| 5,392,344 | 2/1995 | Ash et al. | 379/221 |

FOREIGN PATENT DOCUMENTS

| | | | |
|---|---|---|---|
| 0021792 | 1/1990 | Japan | 379/244 |
| 4156158 | 5/1992 | Japan | 379/243 |

*Primary Examiner*—Jeffery Hofsass
*Assistant Examiner*—Parag Dharia
*Attorney, Agent, or Firm*—Jack R. Penrod

[57] ABSTRACT

A method and apparatus that allows different likelihoods of call completion during very heavy call loading conditions to be supplied to different customers. Customers are assigned to different levels of service and these levels of service are used to manage call completion in throughout the telecommunication network during very heavy call loading periods. Thus, a securities broker may have a higher likelihood of completing a call near the close of a trading session than the average telephone customer. However, each caller may be offered an opportunity to immediately increase his or her level of service and thus likelihood of completing a call to the highest available level if a call is not completed at the caller's lower level of service.

21 Claims, 10 Drawing Sheets

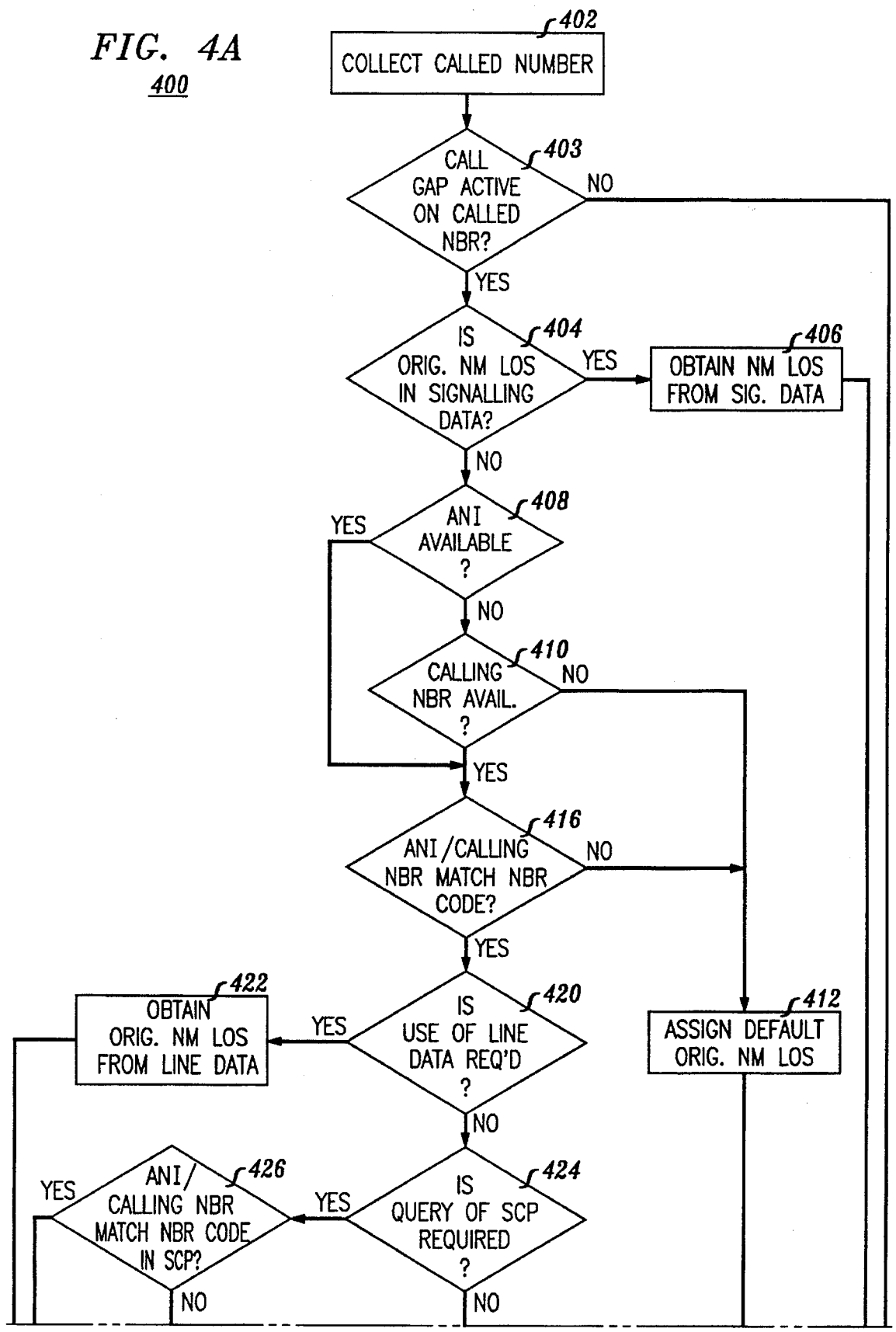

500

600

| FIG. 6A |
| FIG. 6B |

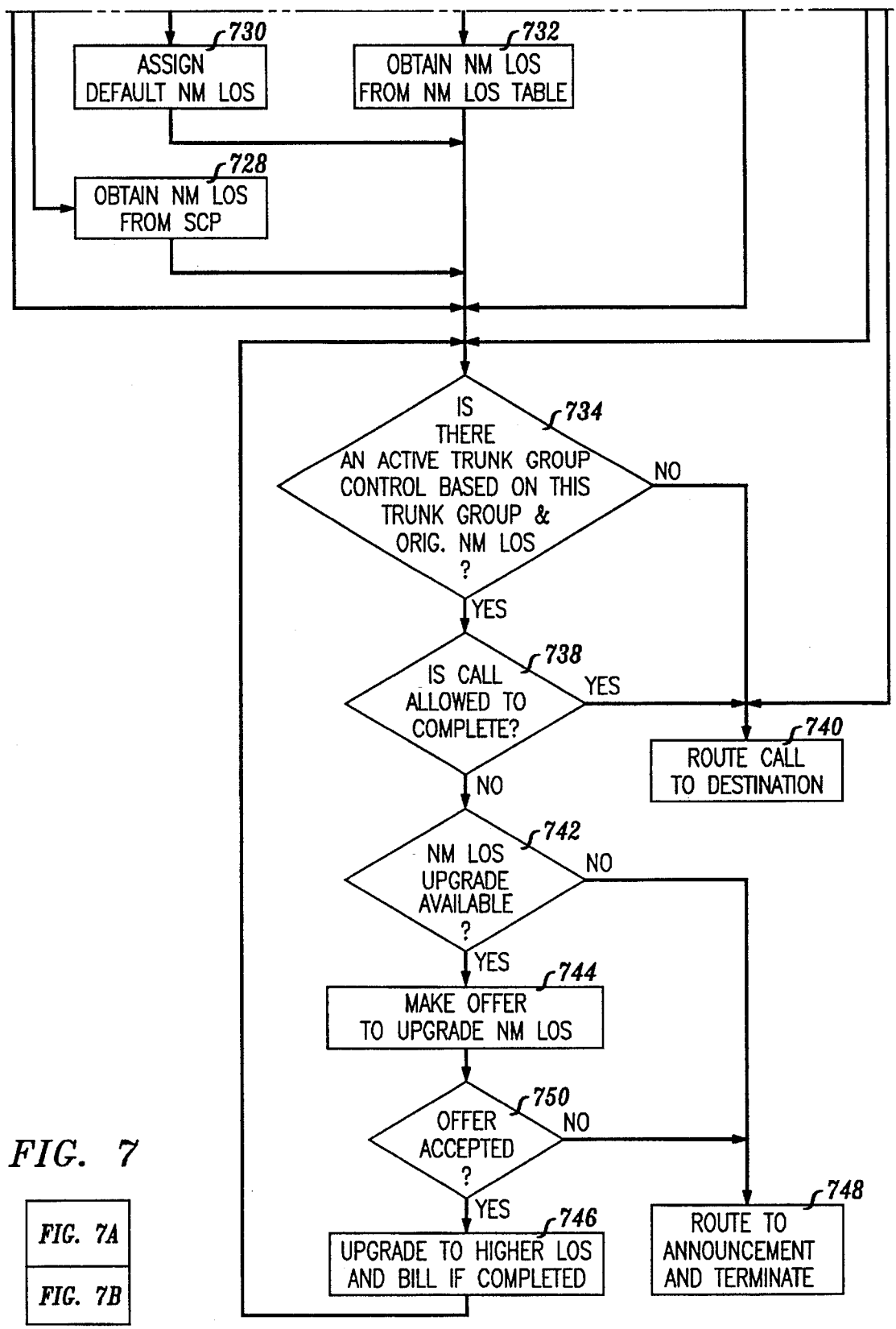

METHOD AND APPARATUS FOR PRIORITIZING A TELEPHONE CALL ACCORDING TO A LEVEL OF SERVICE OF AN ORIGINATOR

TECHNICAL FIELD

This invention relates to a telecommunication system and more particularly to a method and apparatus for providing one or more priority levels for telephone call originators in order to increase the likelihood of completing a high priority calls when the demand for call completion services exceeds capacity.

PROBLEM

The demand for telecommunication services at times exceeds the capacity that the local exchange company or long distance company can supply. When this occurs, the call originator typically receives some type of busy signal. A busy signal is an indication to the call originator that somewhere between his or her telephone and the destination telephone the capacity of the equipment has been exceeded. If the call receiving the busy signal is like most social calls and some business calls, an immediate time response is not necessary and the call originator will just try again later without any ramifications. On the other hand, if the call is a time sensitive business call for which time is very valuable, such as some calls from investors to their investment brokers, the call originator might try again later, but there could be some loss associated with the delay to either the originating party or called party. This latter scenario occurs because the standard telephone service treats all social calls and all business calls with equal importance, i.e. all calls have equal priority.

If the response to a dialed number is a busy signal because the telephone having the dialed number is presently in use, there is not much that the call originator can do about that short of asking an operator to intervene because of an emergency. If, however, the response to a dialed number is a busy signal because the telecommunication equipment between the call originator and the called party is either operating at its full capacity or is overloaded, there are some known ways that may be followed to increase the call originator's chances of completing a call. The first way of increasing a call originator's chances is to increase the chances of getting a dial tone. Getting priority for a dial tone gives an originating party a slight edge in marginally overloaded call connection equipment, but a considerable edge in heavily overloaded call connection equipment. For this reason emergency related telephone numbers, such as police and fire departments, are often provided with a service that gives them priority for dial tones. Once the calling party gets a dial tone and dials the number of the called party, the call originator is back to the standard equal priority for scarce telecommunication resources with every other dialed number. Aside from operator intervention and dial tone priority, the standard telecommunications equipment sometimes places a mid afternoon social call in competition with an investor's order to trade a large block of shares before the market closes for a telephone connection.

The overload that causes the telephone network to return a busy signal, which the originator receives, may occur for anyone of a number of reasons. One common reason is an overload because of a very popular called number, such as a radio station giving away $1,000 to each of the first 10 callers, or a call-in talk show which has the President as a guest. Very popular called numbers have been known to completely clog up local telephone switches. A common solution to this problem is to limit the number of calls that are allowed to be completed and directing the remainder, i.e. the not allowed calls to a busy indication. This solution is referred to as call gapping control based on the called number. This means that after the initial quota of callers to win the give-away or talk to the President have their calls completed, subsequent calls to the popular called number will be gapped by randomly limiting the number of calls per unit time accepted by the originating or tandem switches providing service to the popular called number. A call gapping rate of one call for every three minutes is reasonable for a radio give-away because it takes a call of at least that length to obtain each winner's name and address.

Call gapping control on the called number may also be performed according to just a portion of the called number. In the aftermath of an earthquake or similar disaster, call gapping control according to an area code or an area code and exchange number may be used at a local exchange to keep non-damaged lines open for emergency telephone calls.

There also exists network controls that can be invoked on calls routed to specified trunk groups. As with call gapping controls, trunk group controls randomly select which calls to that trunk group are controlled. However, trunk group controls are typically based on a percentage of calls to that trunk group whereas call gapping controls are based on a number of calls allowed per unit of time.

Unfortunately, neither call gapping nor trunk group control solves the problem of the time sensitive business call, competing with the non-time sensitive social call or the non-time sensitive business call to the same area code or exchange. Call gapping or trunk group control criterion reduces the chances of completing a time sensitive call just the same as it reduces the chances of completing any non-time sensitive call. After a call gapping or trunk group control is instituted at a node of the telecommunication network, the calls that are allowed are randomly selected. Thus, there is a need in the art for a method and apparatus for call gapping or trunk group controls that grants priority to call originators who make time sensitive telephone calls, such as emergency and time sensitive business calls.

SOLUTION

Briefly stated, in accordance with one aspect of the invention, the foregoing problem is solved and an advance over the prior art is made by providing a method of managing the completion of calls according to their respective levels of service associated with their respective numbers of the originating parties in addition to the existing call gapping or trunk group control criterion. Each number of an originating party is assigned a level of service from a plurality of levels of service. When a call is made via a telecommunication system which has a call gapping or trunk group control active, each level of service may be controlled in a respective manner. Thus, if network management control is active because of an overload condition, information associated with the number of the originating party is inspected to determine its level of service and the network management control for that particular level of service is respectively applied to the call.

In another aspect of the invention, the foregoing problem is solved and an advance over the prior art is made by providing in a telecommunication system, an apparatus for selectively controlling a telephone call. The apparatus includes a device for determining from information associated with a telephone station from which the telephone call originates if network management controls are active for the present telephone call based upon a level of service of the telephone call, in addition to existing control criterion. The apparatus also includes a device for applying network management controls to the present telephone call if network management controls are active. The device for applying network management controls either controls this telephone call to its completion or terminates this telephone call.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

FIGS. 7A and 7B together form a flow diagram of method of trunk group control on a level of service which gives the call originator an opportunity to upgrade his or her present level of service.

DETAILED DESCRIPTION

Figure 1:
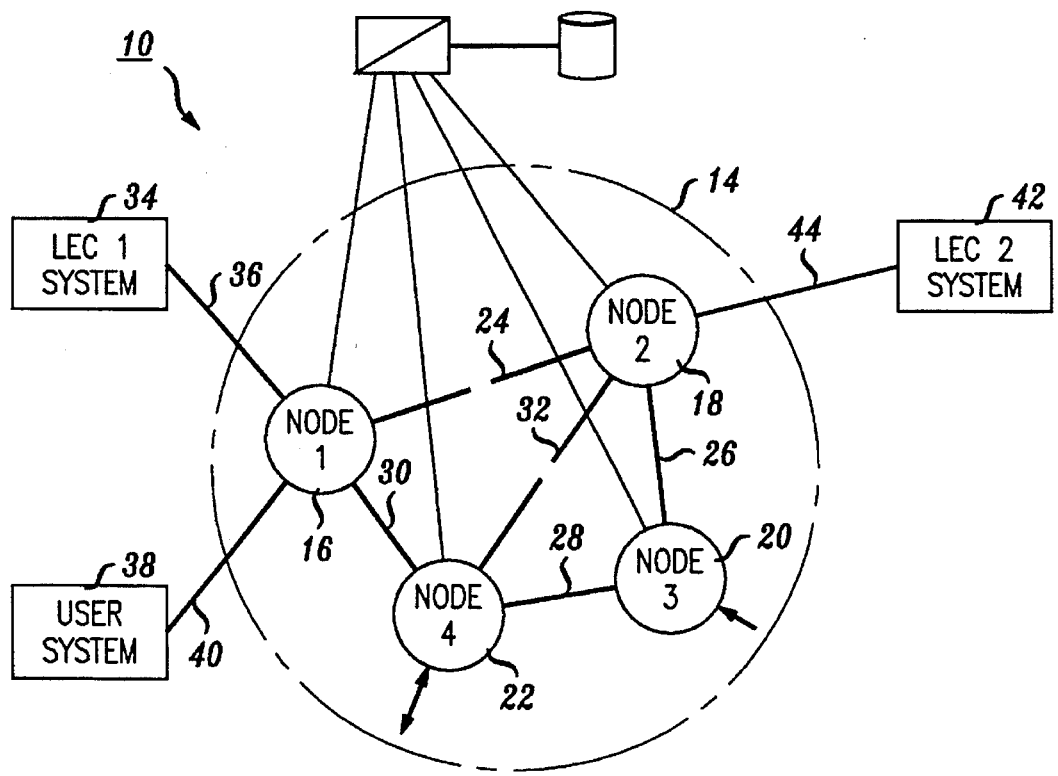
FIG. 1 illustrates a simplified telecommunications network in block diagram form.
Figure 3:
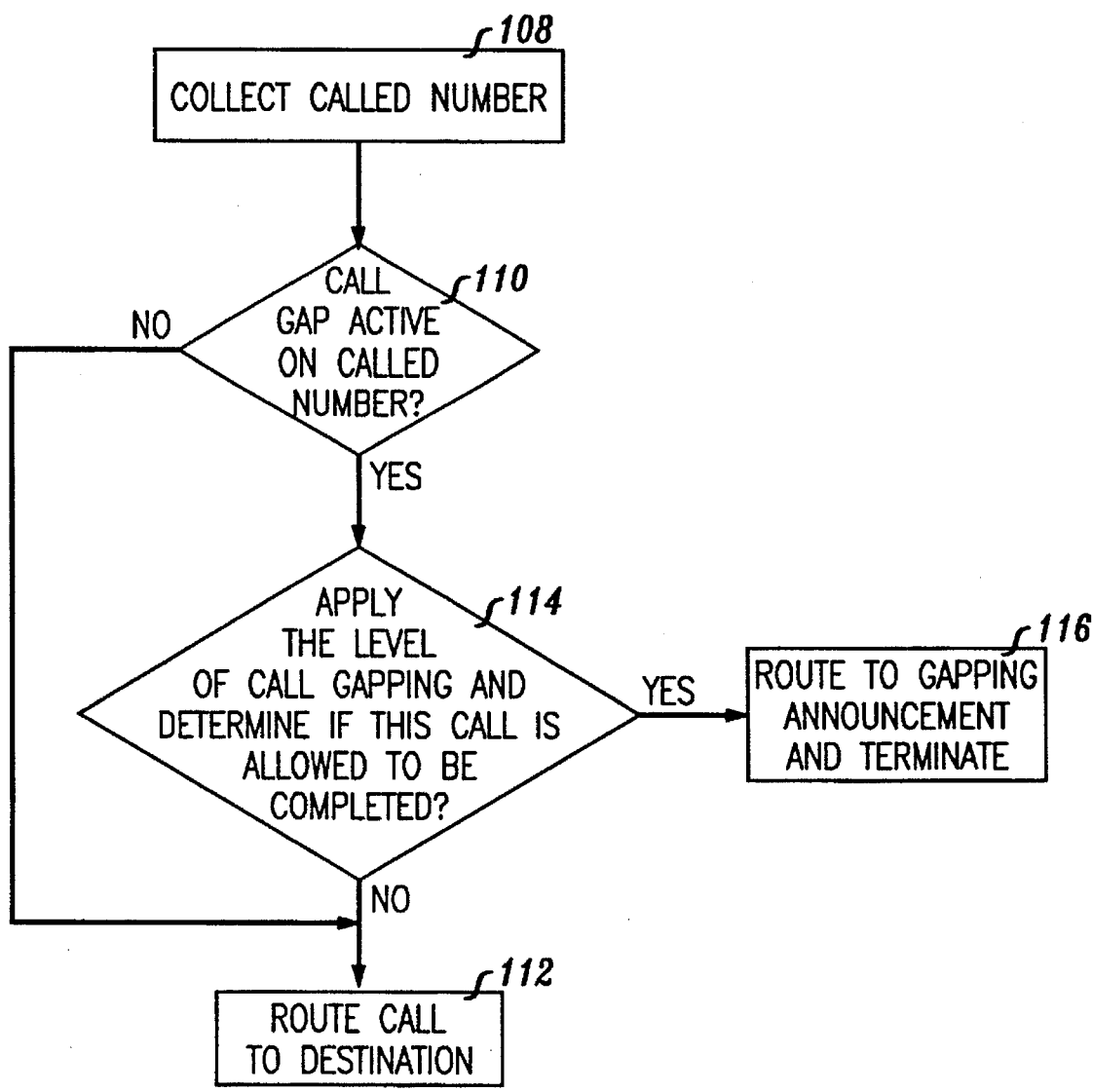
FIG. 3 is a flow diagram of call gapping control based on the called number.

Referring first to FIGS. 1 and 3, the known call gapping control based on the called number will be described. FIG. 1 shows a telecommunication system 10, which may be a portion of a larger telecommunication system (not shown). Telecommunication system 10 includes an inter-exchange carrier system 14. Interexchange carrier system 14 has a number of nodes 16, 18, 20 and 22. Nodes 16–22 are normally interconnected by trunk groups 24, 26, 28, 30 and 32. Trunk group 24 normally connects node 16 to node 18, trunk group 26 connects node 18 to node 20, trunk group 28 connects node 20 to node 22, trunk group 30 connects node 22 to node 16 and trunk group 32 normally connects node 22 to node 18. FIG. 1, for the purposes of example, shows trunk groups 24 and 32 in an abnormal condition, i.e. broken, such as by a natural disaster.

Node 16 is also connected to a local exchange carrier (LEC) system 34 by trunk group 36 and to a user system 38 by trunk group 40. Similarly, Node 18 is also connected to another local exchange carrier system 42 by trunk group 44. Nodes 20–22 may have other connections, but these are not shown for simplification.

With trunk groups 24 and 32 broken, as shown, the number of trunk groups and trunks available for communicating in the interexchange network 14 with node 18 goes down by two-thirds. Calls from LEC 34 destined for LEC 42 and vice-versa must pass through trunk groups 36, 30, 28, 26 and 44. This type of situation is the type for which call gapping and trunk group controls based upon the called number have been used in the past.

Referring now to FIG. 3, the method 100 of call gapping on the called number will be described. Method 100 may be implemented in software in an intelligent telecommunication switching system, such as the 5ESS® Switch manufactured by AT&T Corp. Method 100 begins with action 108 when the switch collects the called number. Action 108 then directs the call to action 110. Action 110 determines if call gapping is active for this called number.

If call gapping for this called number is not active, action 110 directs the call to action 112 which routes the call to its destination. If call gapping for this called number is active, action 110 directs this call to action 114. Since call gapping must be active to arrive at action 114, action 114 determines whether the present call is to be completed to its called number or whether it is to be gapped, i.e., not completed. This determination is made according to the call gapping rate which is set by the system operator of the system or node performing method 100. For example, with a call gapping rate of one call per 5 minutes, only one call is allowed every 5 minutes. If the call gapping rate is one call in infinity, each call has a zero chance of being completed. If action 114 determines that a call is allowed to be completed then the allowed call is directed to action 112 and is routed to its destination. If action 114 determines that the present call is to be gapped, instead, action 114 directs the present call to action 116, which is an announcement such as "I'm sorry all lines are busy now, please try again later."

Trunk group control based on the called number works in very much the same manner. The originator has no control over the success of his or her call completion at action 114 if a call gapping or trunk group control is in effect: successful completion is totally random as far as the originator is concerned.

Figure 2:
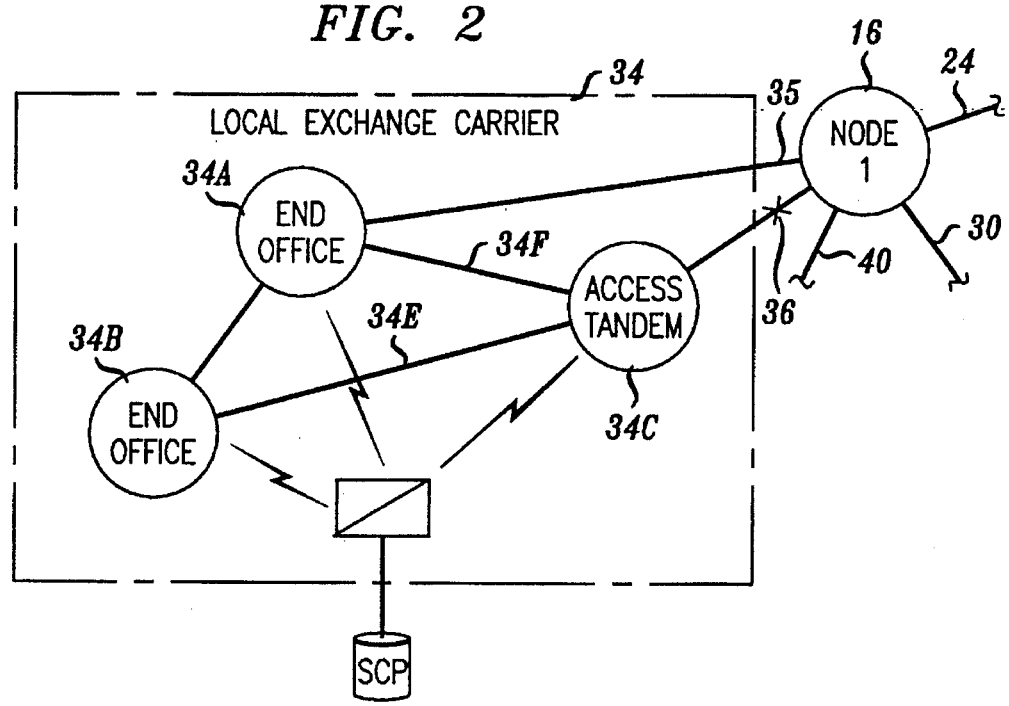
FIG. 2 illustrates details of a LEC shown in FIG. 1 in block diagram form.

Tables 1 and 2 illustrate how operator entered information for call gapping and trunk group controls is stored in their respective portions of a telecommunication system, for example the system 10 shown in FIGS. 1 and 2.

Referring to Table 1, a call to called number (999)-555-5555 will be gapped greatly at level 9, e.g. one call every 15 minutes. Called number (999)-555-5555 is a popular number, such as a ticket reservation service or a television station that carries a popular talk show, and this popular number is presently very popular as indicated by the level 9 call gapping. The other entry, (999)-999-XXXX illustrates that call gapping may be performed based on only a portion of the called number. The exchange (999)-999 may be over burdened, for example because of an injury to part of the system, and a gapping level of 2 is entered by an operator for the entire (999)-999 exchange. Thus, to keep the overburdened part of the system from jamming up the rest of the telecommunication system calls to the (999)-999 exchange are gapped moderately at a gapping level of 2.

Referring now to Table 2, three types of known trunk group controls will be described. As shown in the first row of Table 2, presently there is an operator entered trunk group control to cancel 50% of the calls routed to trunk group number 47. The second row of Table 2 indicates that there is an operator entered trunk group control to re-route 25% of the calls to trunk group number 52 to out of pattern trunk group 91. The third row of Table 2 indicates that there is an operator entered trunk group control to transfer or skip 75% of the calls to trunk group number 63 to the next trunk group of the standard pattern. These trunk group control levels are typically activated to reduce or redistribute call traffic such that no part of the telecommunication system 10 is overburdened.

TABLE 1

CALL GAPPING CONTROL INFORMATION

| CALLED No. | GAPPING LEVEL |
| --- | --- |
| 999-555-5555 | 9 |
| 999-999-XXXX | 2 |

TABLE 2

TRUNK GROUP CONTROL INFORMATION

| TRUNK GROUP No. | TYPE OF CTRL | CTRL LEVEL |
| --- | --- | --- |
| 47 | Cancel-to 47 | 50% |
| 52 | Re-Route to 91 | 25% |
| 63 | Transfer to Next 75% | |

Tables 3, 4 and 5 illustrate the call gapping and trunk group control data according to the present invention. Table 3 illustrates, in a simplified example, how network management levels of service (NM LOSs) may be associated with originating numbers. For entries in the table that refer to the same originating number, the entry with the most number of significant digits specified takes precedence (e.g., (777)-777-5XXX takes precedence over (777)-777-XXXX). According to Table 3, every call originating from exchange (777)-777-XXXX has a medium NM LOS of 3, except for calls originating numbers in the (777)-777-5000 through (777)-777-5999 range which have higher NM LOSs of 2. Thus, financial institutions may request numbers in the higher NM LOS ranges and for a fee be assigned originating numbers in the (777)-777-5000 to (777)-777-5999 range that has an NM LOS of 2. Similarly, a residential customer may be offered a special low rate if a lower NM LOS is acceptable, for example originating number (999)-999-9999 shown in Table 3 below. All of these call processing service variations are made possible by the present invention.

The last two lines of Table 3 illustrate that part of an originating number, for example exchanges (999)-224-XXXX and (999)-223-XXXX, may be used as keys to access (dip into) databases with all or part of an originating number in order to retrieve an NM LOS associated with that originating number. In such a case, the retrieved NM LOS, if any, is used for further call processing.

TABLE 3

NM LOS ACCORDING TO ORIGINATING NUMBER

| ORIGINATING No. | NM LOS |
| --- | --- |
| 777-777-5XXX | 2 |
| 777-777-XXXX | 3 |
| 999-999-9999 | 4 |
| 999-224-XXXX | SCP DIP |
| 999-223-XXXX | LINE DATA DIP |

Tables 4 and 5 are similar to Tables 1 and 2 respectively, except that Tables 4 and 5 each has an additional column and at least one additional row. The additional column is for the system operators to enter the network management levels of service (NM LOS)for the active call gapping and trunk group controls.

Table 4, like Table 1 has call gapping active for called number (999)-555-5555 and for all the numbers in the exchange (999)-999-XXXX. However, there are more call gapping possibilities in Table 4 because of the additional NM LOS entries. Thus there may be multiple entries for each active call gapping, as shown in Table 4. According to Table 4, popular called number (999)-555-5555 is gapped greatly for originators having network management levels of service of 3 or 4; however, for originators having network management levels of service of 2 the gapping rate is moderate, so the likelihood of completing a call to the popular number can vary significantly depending upon the originator's NM LOS. Similarly, for the overburdened exchange area call gapping situation, such as exchange (999)-999 shown in Table 4, call originators with NM LOSs of 3, 4 or 5 will experience gapping at a moderate rate, while call originators with NM LOSs of 2 will not experience call gapping at level 0, i.e. not at all. Thus, the network operators have more call gapping possibilities and greater flexibility to provide the services that their customers want and need.

TABLE 4

CALL GAPPING CONTROL INFORMATION

| NM LOS | CALLED No. | GAPPING LEVEL |
| --- | --- | --- |
| 3 or 4 | 999-555-5555 | 9 |
| 2 | 999-555-5555 | 3 |
| 3, 4 or 5 | 999-999-XXXX | 3 |
| 2 | 999-999-XXXX | 0 |

The impact of the NM LOS on active trunk group controls is less dramatic for the transfer and re-route trunk group controls because even if a call is transferred or re-routed to alternate trunk group either in the normal pattern or outside of the normal pattern, these network management actions are transparent to the call originator. A caller in Chicago, Ill. calling Los Angles, Calif. doesn't care if the call is routed through St. Louis, Mo., Kansas City, Mo. or Fort Worth Tex. as long as the call is completed. The impact of the NM LOS on the cancel-to trunk group control may be very dramatic because the results are dramatic to some of the call originators. For example, trunk group number 47 has an active cancel-to trunk group control that cancels 60% of the calls to trunk group 47 for call originators with NM LOSs of 3,4 or 5. Call originators with a NM LOS of 2 can be provided with a lower control rate, such as the 30% shown in Table 5, which gives them twice the likelihood of not being canceled by the active cancel-to trunk group control.

TABLE 5

TRUNK GROUP CONTROL INFORMATION

| NM LOS | TRUNK GROUP No. | TYPE OF CTRL | CTRL LEVEL |
| --- | --- | --- | --- |
| 3, 4 or 5 | 47 | Cancel-to 47 | 60% |
| 2 | 47 | Cancel-to 47 | 30% |
| 2, 3, 4 or 5 | 52 | Re-Route to 91 | 25% |
| 2, 3, 4 or 5 | 63 | Transfer to Next 75% | |

The NM LOSs of the call originators provide a way for the telecommunication system to differentiate between non-time sensitive telephone calls and time sensitive originators. To originators who know that they constantly have time sensitive telephone calls to make, an NM LOS of 2, the highest level represented in Tables 3, 4 and 5, would be worth an extra fee. The telecommunications system operators may give the lower NM LOS originators either a few use-or-lose single call upgrades to NM LOS 2 or may offer single call upgrades to a higher NM LOS for a fee which would only be collected if the call is completed.

As can be seen from Tables 3, 4 and 5, the NM LOS for an originating number is essential for determining whether NM controls, such as call gapping and trunk group controls, should be applied to a given call from that number. Although the ubiquity of this service will be decided by the service providers, it is possible that any node in FIGS. 1 and 2 may be required to access the originator's NM LOS data for each call. This is possible since each of these nodes currently have call gapping and trunk group controls. Also, the service providers and standards bodies will determine how each of these nodes in FIGS. 1 and 2 will determine the NM LOS for a given originator's call. Hence, the possible methods will be described herein. The NM LOS data can reside with resident line data in the originating switch. In addition the NM LOS data can be derived from the originating number using tables similar to Table 3 mentioned above, that can reside in any node of FIGS. 1 and 2, including the SCP node. This requires these nodes to have the originating number of the call, which may be passed in the call signaling data from the originating office to the subsequent offices involved in the call. The originating number can either be the automatic number identification (ANI) that usually identifies the calling station for billing purposes, or the calling number which used for custom calling features. As an alternative to requiring the switch (node) to use the originating number to derive the NM LOS, the NM LOS may be passed with the call signaling data from the originating office to the subsequent offices involved in the call.

Figure 4B:
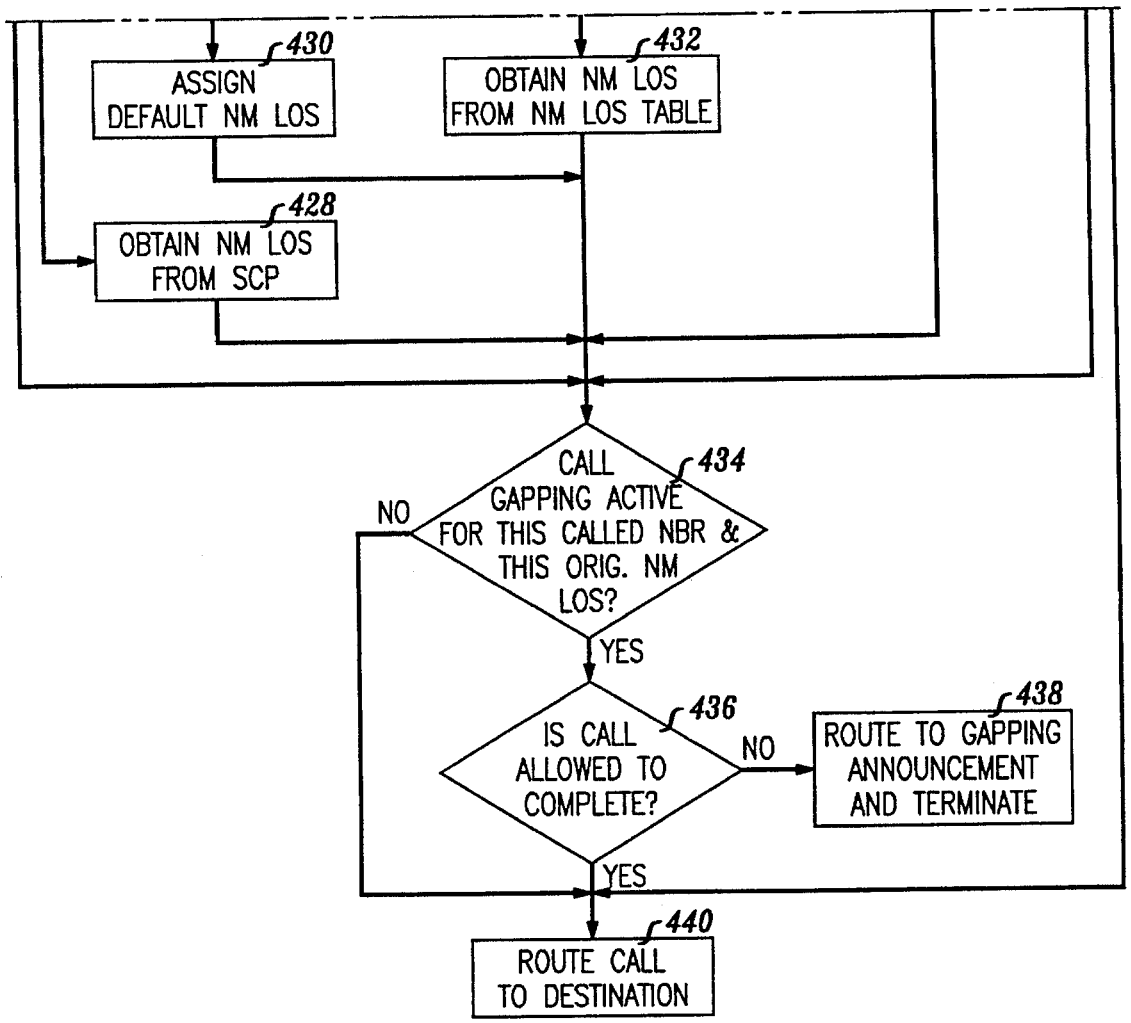
FIGS. 4A and 4B together form a flow diagram of a method of call gapping on a level of service according to the present invention.
Figure 4:
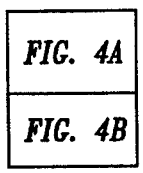

Referring now to FIGS. 4A and 4B, a method 400 for call gapping according to the NM LOS of the call originator is illustrated. This could be performed by any of the nodes shown in FIGS. 1 and 2. The first step of method 400 is step 402, which collects the called number. Next, decision 403 checks if call gapping is active for this called number. If call gapping is not active for this called number, then the method 400 proceeds to action 440 which routes the call. If call gapping is active for this called number, then the method 400 proceeds to action 404 which checks to determine if the originator's NM LOS is contained in the network signaling data associated with this call. Existing inter-office signaling data, which is transmitted in-band or out-of-band with respect to the facility carrying the call, could be used to pass the NM LOS with the call from office to office. If NM LOS for this call is contained in signaling data, the method proceeds to action 406. Action 406 obtains the NM LOS from signaling data and proceeds to decision 434 with NM LOS determined.

If NM LOS is not contained in signaling data the method 400 proceeds to decision 408 determine if an ANI is available with the present call. If ANI is not available, decision 408 directs the method 400 to decision 410 which determines if calling number information is available. If calling number information is not available (and ANI is not available), an NM LOS cannot be determined from stored data, for such a situation decision 410 directs the method 400 to step 412. Step 412 assigns a default NM LOS and directs the method 400 to decision 434 for call gap proceeding based on a default NM LOS. If ANI is available at decision 408 or if the calling number is available at step 410 (one or both is the normal situation) the method 400 progresses to decision 416.

Decision 416 determines if there is a match between the ANI or calling number of the present call and the associated data contained in the NM LOS table, such as Table 3 above. If decision 416 does not find a match to the ANI or the calling number, the method proceeds to action 412 where a default origination NM LOS is assigned, for example the NM LOS of non time sensitive originators. If decision 416 finds a match, the data associated with the originating number of the present call is retrieved from the table or database, and the method proceeds to decision 420. Decision 420 examines the associated data retrieved in decision 416 and determines if line data must be used to determine the NM LOS of the present call. If line data must be used, decision 420 proceeds to action 422 which obtains the originator's NM LOS from line data associated with the call, and subsequently proceeds to decision 434. If use of line data is not required, decision 420 proceeds to decision 424.

Decision 424 examines the associated data retrieved in decision 416 and determines if a query of an SCP database is required. If such a query is required, the method proceeds to decision 426 which determines if the ANI or the calling number of the present call has a matching entry in the SCP database. If there is a match, decision 426 directs the method to action 428 which retrieves the NM LOS for the present call from the SCP database and proceeds to decision 434. If there is no matching number in the SCP database, decision 426 directs the method to action 430, which assigns a default NM LOS to the present call and the method proceeds to decision 434. If at decision 424 a query of the SCP database is not required, that means that the NM LOS is available in the NM LOS table and the method proceeds to action 432. Action 432 retrieves the NM LOS for the present call from the NM LOS table and proceeds to decision 434.

In order to arrive at decision 434, the present call must have an NM LOS associated with the originating number, either an NM LOS was associated with the present call and retrieved or a default NM LOS was assigned and is now associated with the present call. Decision 434 uses the NM LOS along with the called number to determine if call gapping is active for the present call. If in decision 434 the called number and NM LOS both match an entry in the call gapping table, for example Table 4 above, then call gapping is active for this call. Decision 434 then retrieves a call gapping rate from a stored call gapping table, and proceeds to decision 436. Decision 436 stores call gapping statistics for each call gapping that is active. Decision 436 uses these statistics to apply the call gapping rate of the present call to determine if the present call shall be allowed to be completed. If decision 436 determines that the present call shall not be completed, the method proceeds to action 438 which routes the present call to a call not allowed announcement, such as 'We're sorry, all circuits are busy now. Please try again later.' If, on the other hand, decision 436 determines that the present call shall be allowed even with the present call gapping rate, or if decision 434 determines that call gapping is not active for this call, the method proceeds to action 440 which routes the present call to the called number. Under normal circumstances, it is expected that a very high percentage of the calls placed would be routed to their destination.

Figure 5A:
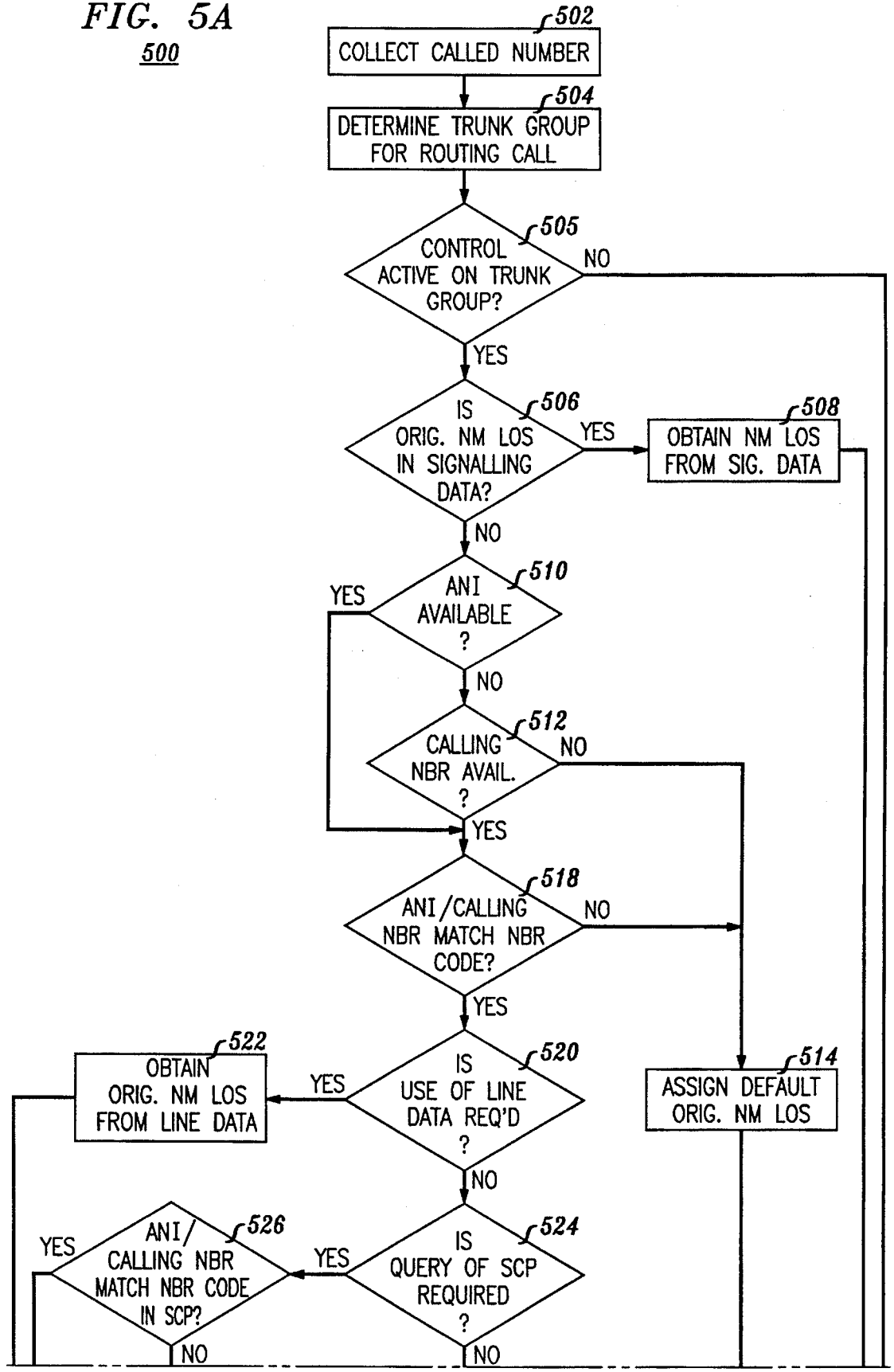
FIGS. 5A and 5B together form a flow diagram of a method of trunk group call control based upon a level of service.
Figure 5B:
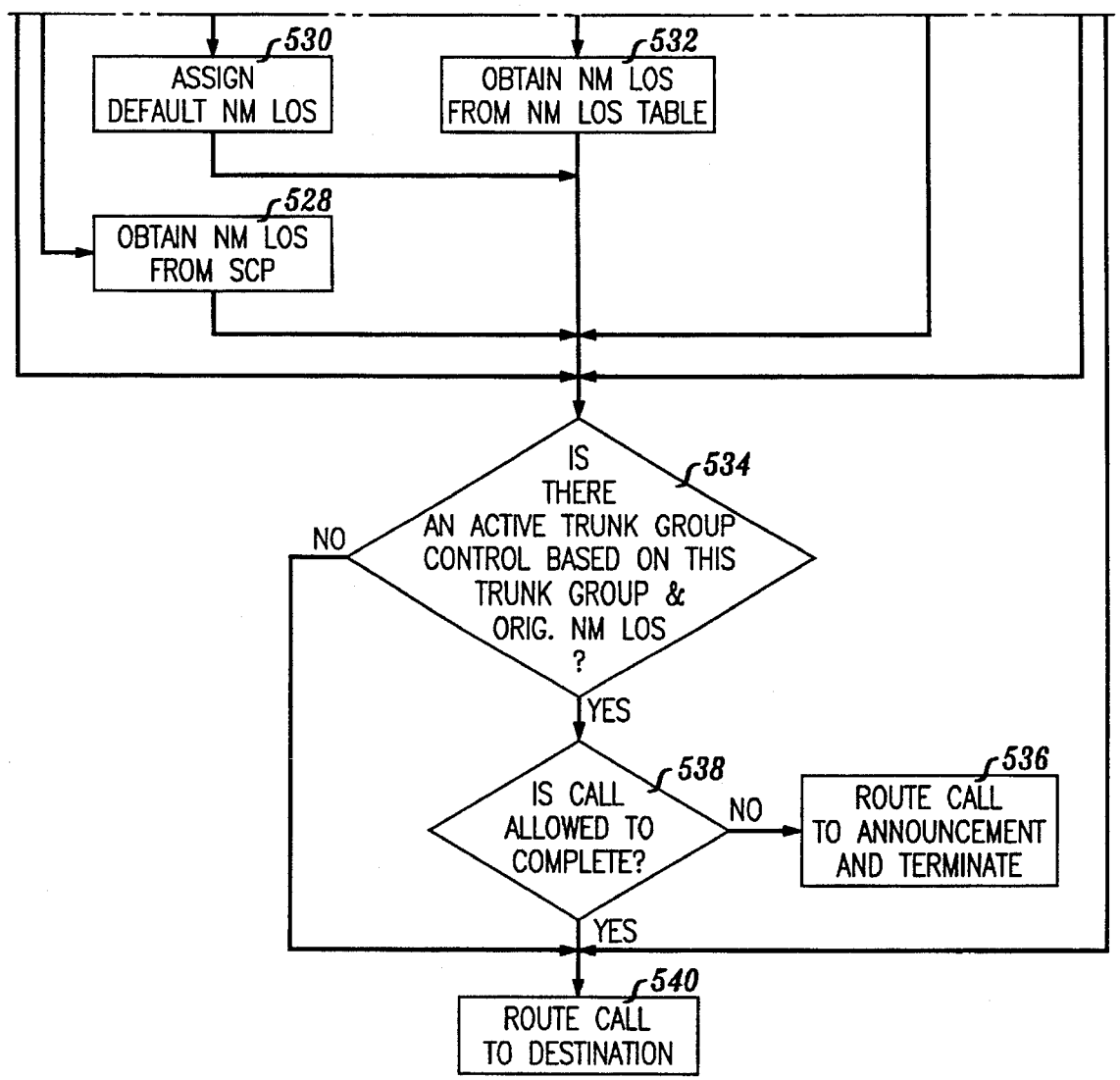
Figure 5:
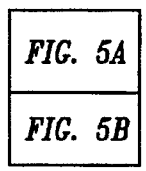

Referring now to FIGS. 5A and 5B, a method 500 for trunk group control according to the NM LOS of the call originator for use on inter LATA calls is illustrated. This could be performed by any of the nodes shown in FIGS. 1 and 2. The first step of method 500 is step 502, which collects the inter exchange called number. Next action 504 determines a trunk group for routing the called number.

After a trunk group for routing the present call is determined, decision 505 determines, by searching the trunk group control table such as Table 5 above, if this trunk group has a trunk group control active. If this trunk group does not have a control active, then the method 500 proceeds to action 540 which routes the call. If this trunk group does have a control active, then the method 500 proceeds to decision 506, which checks to determine if originator's NM LOS is contained in signaling data associated with this call. If NM LOS for this call is contained in signaling data, the method proceeds to action 508. Action 508 obtains the NM LOS from signaling data if possible and proceeds to decision 534 with NM LOS determined.

If NM LOS is not contained in signaling data the method 500 proceeds to decision 510 to determine if an ANI is available with the present call. If ANI is not available, decision 510 directs the method 500 to decision 512 which determines if calling number information is available. If calling number information is not available (and ANI is not available), an NM LOS cannot be determined from stored data, for such a situation decision 512 directs the method 500 to action 514. Action 514 assigns a default NM LOS and directs the method 500 to decision 534 for trunk group control proceeding based on a default NM LOS. If ANI is available at decision 510 or if the calling number is available at step 512 (one or both is the normal situation) the method 500 progresses to decision 518.

Decision 518 determines if there is a match between the ANI or calling number of the present call and the associated data contained in the NM LOS table, such as Table 3 above. If decision 518 does not find a match to the ANI or the calling number, the method proceeds to action 514 where a default origination NM LOS is assigned, for example the NM LOS of non time sensitive originators. If decision 518 finds a match, the data associated with the originating number of the present call is retrieved from the table or database and the method proceeds to decision 520. Decision 520 examines the associated data retrieved in decision 518 and determines if line data must be used to determine the NM LOS of the present call. If line data must be used, decision 520 proceeds to action 522 which obtains the originator's NM LOS from line data associated with the call, and subsequently proceeds to decision 534. If use of line data is not required, decision 520 proceeds to decision 524.

Decision 524 examines the associated data retrieved in decision 518 and determines if a query of an SCP database is required. If such a query is required, the method proceeds to decision 526 which determines if the ANI or the calling number of the present call has a matching entry in the SCP or other database. If there is a match, decision 526 directs the method to action 528 which retrieves the NM LOS for the present call from the SCP database and proceeds to decision 534. If there is no matching number in the SCP database, decision 526 directs the method to action 530, which assigns a default NM LOS to the present call and the method proceeds to decision 534. If at decision 524 a query of the SCP database is not required, that means that the NM LOS is available in the NM LOS table and the method proceeds to action 532. Action 532 retrieves the NM LOS for the present call from the NM LOS table and proceeds to decision 534.

In order to arrive at decision 534, the present call must have an NM LOS associated with the originating number, either a stored NM LOS was associated with the present call and retrieved or a default NM LOS was assigned and is now associated with the present call. Decision 534 uses the NM LOS along with the trunk group to determine if trunk group control is active for the present call. If trunk group control is active, decision 534 retrieves a trunk group control type and rate from a stored trunk group control table, for example Table 5 above, and the method proceeds to decision 536. Decision 536 stores trunk group control statistics for each trunk group control that is active. Decision 536 uses these statistics to apply the trunk group control rate of the present call to determine if and how the present call shall be allowed to be completed. If decision 538 determines that the present call shall not be completed, the method proceeds to decision 536 which routes the present call to a call-not-allowed announcement, such as 'We're sorry, all circuits are busy now. Please try;again later.' If, on the other hand, decision 538 determines that the present call shall be allowed by the present trunk group control rate, or if decision 534 determines that trunk group control is not active for the present call, the method proceeds to action 540 which routes the present call to the called number. Under normal circumstances, it is expected that a very high percentage of the calls placed would be routed to their destination. Further, if a call is subject to the reroute or transfer-to trunk group control, the change in routing probably will be unnoticeable to the originating and called parties.

Figure 6A:
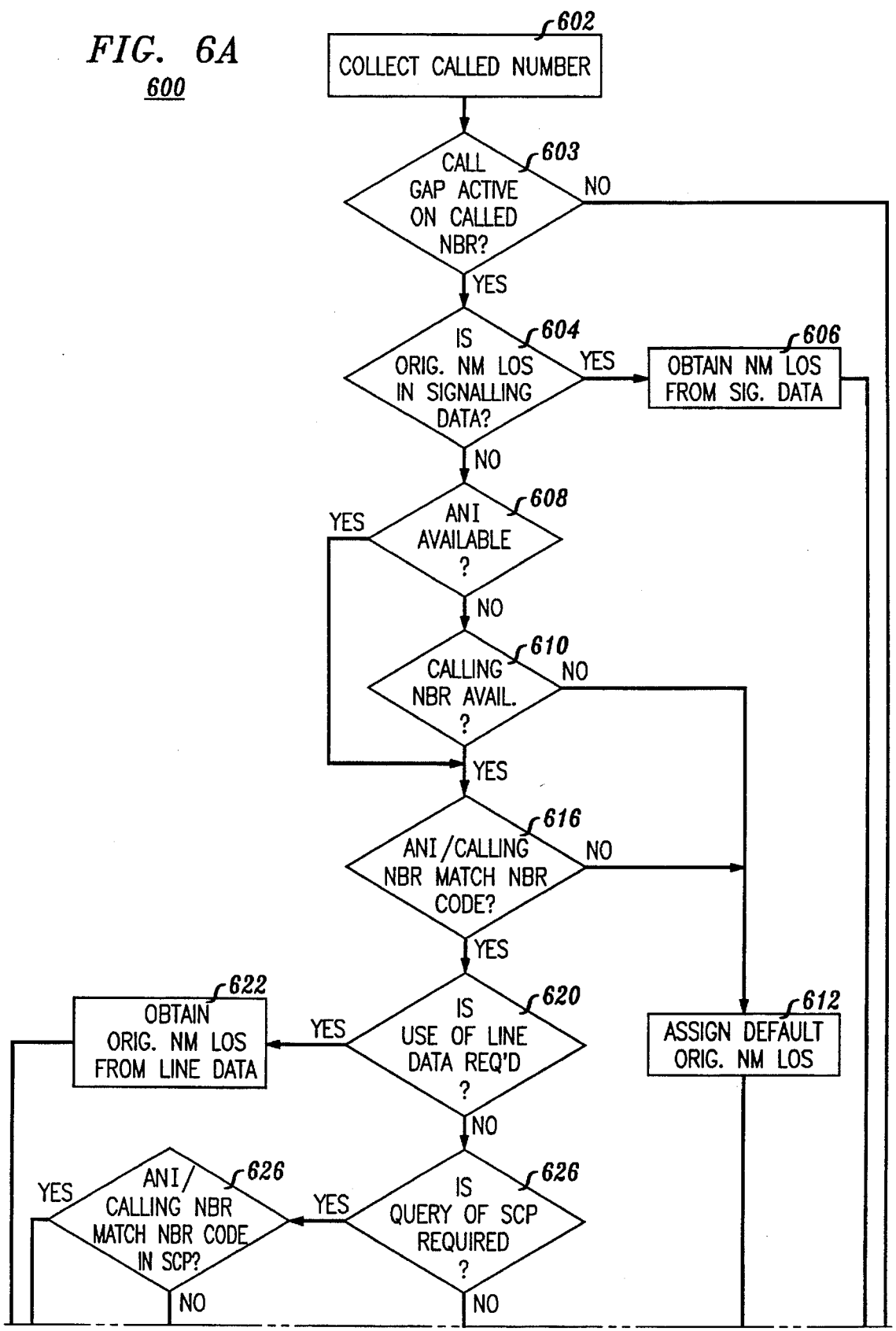
FIGS. 6A and 6B together form a flow diagram of method of call gapping on a level of service which gives the call originator an opportunity to upgrade his or her present level of service.
Figures 6, 6B:
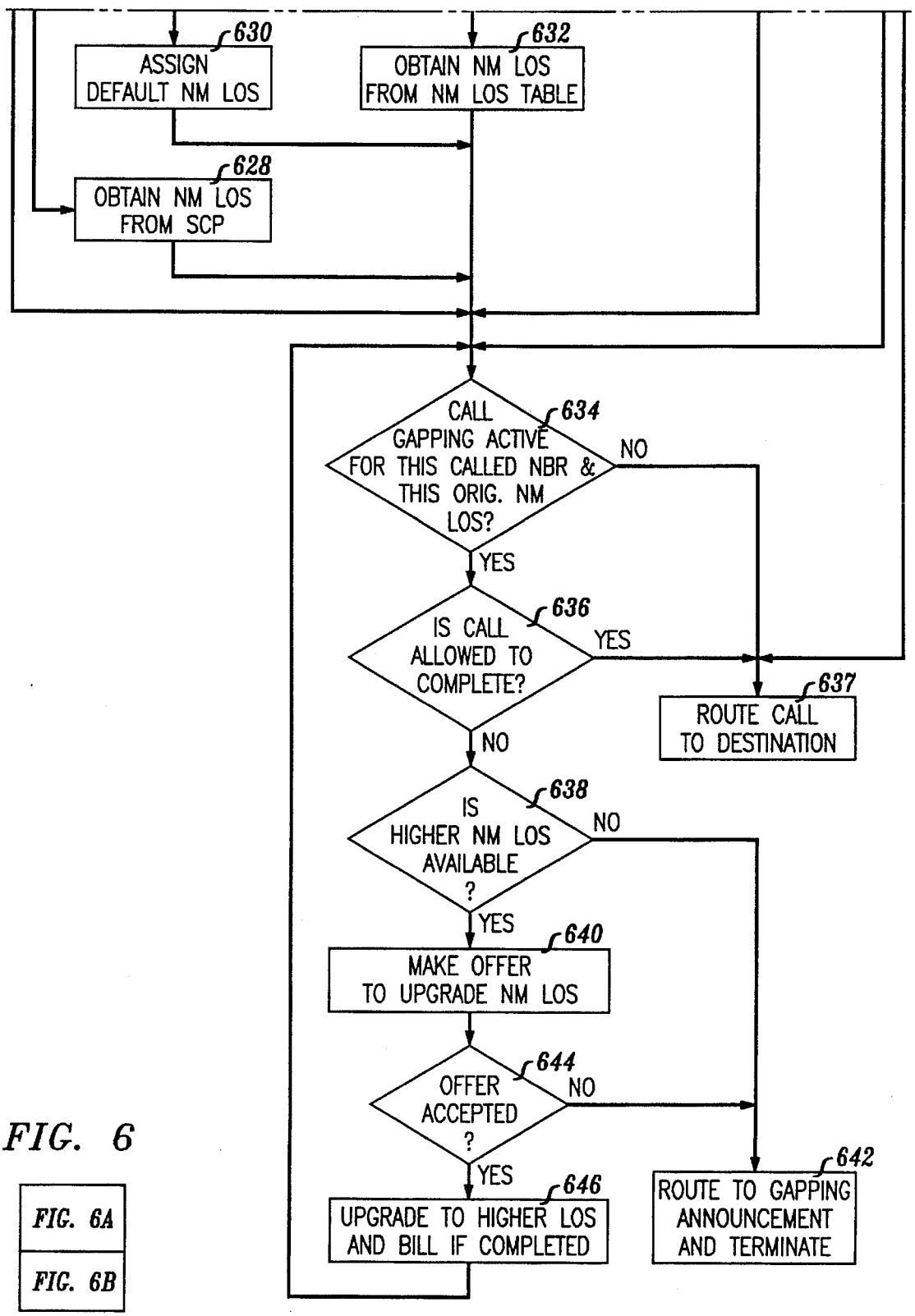

Referring now to FIGS. 6A and 6S, another method, method 600, according to the invention will be described. Method 600 is essentially the same as method 400, except that if decision 636 (the corresponding decision to decision 436 of method 400) determines that this call is to be gapped, i.e., not completed, the call is directed to decision 638 instead of an announcement. Decision 638 determines if the originator has the highest NM LOS available. If the caller presently has the highest NM LOS available, then decision 638 directs the method 600 to action 642 and the originator receives a 'Please try again later announcement.' If, on the other hand, the originator is not presently at the highest NM LOS available, decision 638 directs the method to proceed to action 640 which is an announcement to the originator that a one-time upgrade of his or her NM LOS for this call could be purchased for a fee. The announcement would give the fee and the resulting increase in call completion probability, and then give the originator the option of selecting a higher NM LOS for a fee by some action, such as dialing a digit or not. Subsequently, decision 644 determines if the originator has selected the optional upgrade to his or her NM LOS. If the originator declines the upgrade and stays on the line decision 644 directs the call to action 642 and the caller receives the 'Please try again later° announcement. If, on the other hand, the caller elects to upgrade to a higher NM LOS, decision 644 directs the method to proceed back to decision 634 with the newly upgraded NM LOS. Action 634 determines whether call gapping is active for the present call and its upgraded NM LOS. If call gapping is not active for the upgraded NM LOS, the method proceeds to action 640 and the call is routed to its destination. Upon completion with an upgraded NM LOS, the originator is charged the upgrade fee. If decision 634 determines that call gapping is active for the present call even with its upgraded NM LOS, the method 600 proceeds to decision 636 to determine if the present call (with upgraded NM LOS) is to be completed to its destination number or whether it is to be gapped. The upgraded NM LOS and the call gapping rate of the upgraded NM LOS are used to make this determination as in method 400 shown in FIGS. 4A and 4B.

If the result of decision 638 is that this call should be completed, then method 600 proceeds to action 637 and the call is routed to its destination. Upon completion with an upgraded NM LOS, the originator is charged the upgrade fee as above. If, on the other hand, the result of decision 638 is that this call is still not to be completed, the method proceeds again to decision 638 to either upgrade if possible or be routed to a 'Please try again later' announcement. The upgrade fee would not be charged unless the upgrade was selected and the call was completed.

Figure 7A:
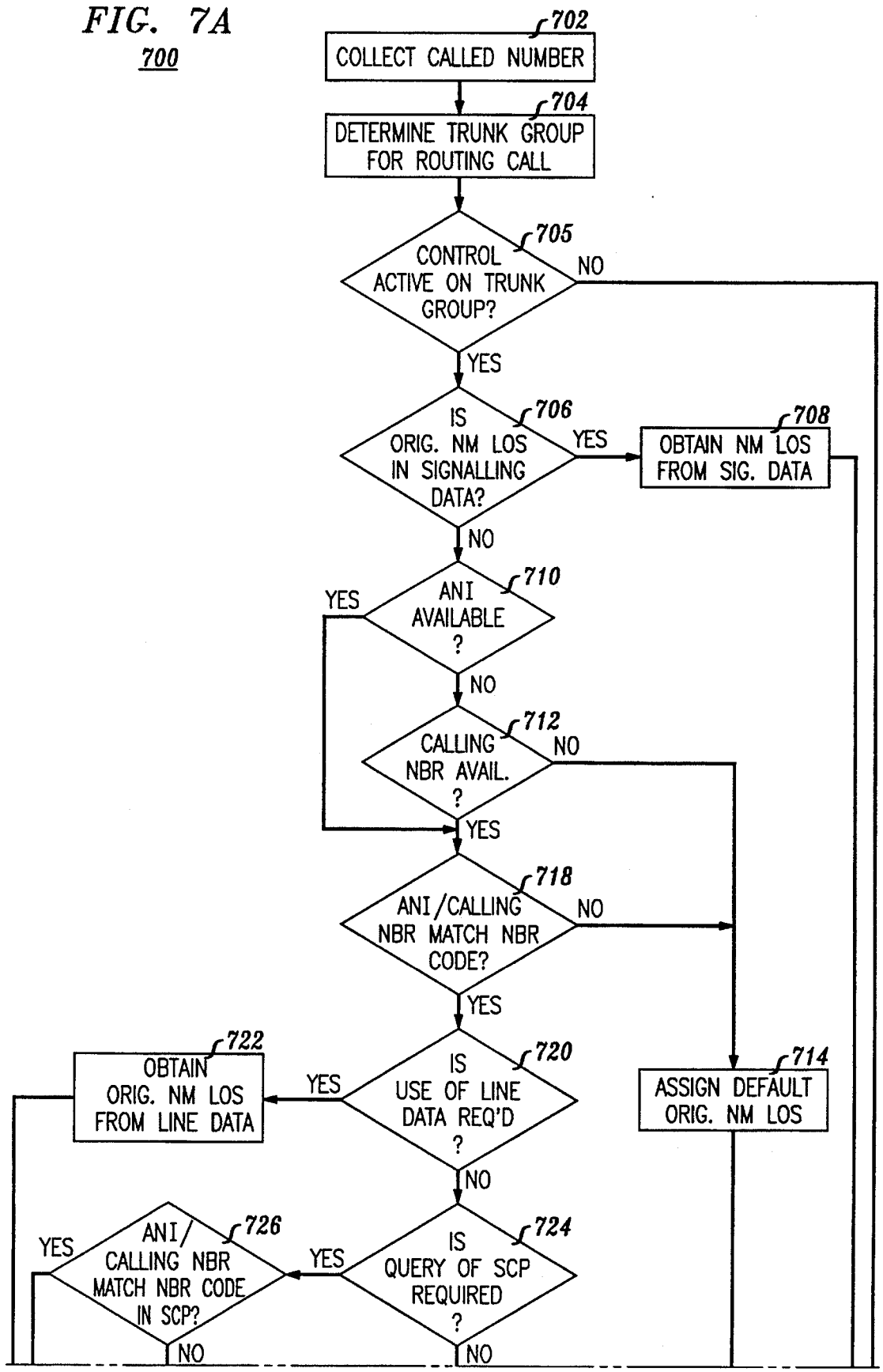

Referring now to FIGS. 7A and 7B, another method, method 700, according to the invention will be described. Method 700 is essentially the same as method 500, except that if decision 738 (the corresponding decision to decision 538 of method 500) determines that this call is to be canceled, i.e., not completed, the call is directed to decision 742 instead of an announcement. Decision 742 determines if the originator has the highest NM LOS available. If the originator presently has the highest NM LOS available, then decision 742 directs the method 700 to action 748 and the originator receives a 'Please try again later announcement.' If, on the other hand, the originator is not presently at the highest NM LOS available, decision 742 directs the method to proceed to action 744 which is an announcement to the originator that a one-time upgrade of his or her NM LOS for this call could be purchased for a fee. The announcement would give the fee and the resulting increase in call completion probability, and then give the originator the option of selecting a higher NM LOS for a fee by some action, such as dialing a digit or not. Subsequently, decision 750 determines if the originator has selected the optional upgrade to his or her NM LOS. If the originator declines the upgrade and stays on the line decision 750 directs the call to action 748 and the caller receives the 'Please try again later' announcement. If, on the other hand, the caller elects to upgrade to a higher NM LOS, decision 750 directs the method to proceed back to decision 734 with the newly upgraded NM LOS. Decision 734 determines whether trunk group control is active for the present call, its upgraded NM LOS and its trunk group. If trunk group control is not active for the upgraded NM LOS, the method proceeds to action 740 and the call is routed to its destination over the present trunk group. Upon completion with an upgraded NM LOS, the originator is charged the upgrade fee. If decision 734 determines that trunk group control is active for the present call even with its upgraded NM LOS, the method 700 proceeds to decision 738 to determine if the present call (with upgraded NM LOS) is to be completed by its present trunk group to its destination number, completed by another trunk group to its destination number or canceled. The upgraded NM LOS and the trunk group control rates for the upgraded NM LOS are used to make this determination as in method 500 shown in FIGS. 5A and 5B. If the result of decision 738 is that this call should be completed, then method 700 proceeds to action 740 and the call is routed to its destination. Upon completion with an upgraded NM LOS, the originator is charged the upgrade fee as mentioned above. If, on the other hand, the result of decision 738 is that this call is still not to be completed, the method proceeds again to decision 742 to either upgrade if possible or be routed to a 'Please try again later' announcement. The upgrade fee would not be charged unless the upgrade was selected and the call was completed.

These methods 600 and 700 would benefit a business traveler by allowing the traveler during an over-burdened condition to upgrade his or her NM LOS while making a time sensitive call from a pay phone.

Thus, it will now be understood that there has been disclosed a method and apparatus for call gapping calls according to an originating number or a level of service associated therewith. While the invention has been particularly illustrated and described with reference to preferred embodiments thereof, it will be understood by those skilled in the art that various changes in form, details, and applications may be made therein. For example, more than two levels of commercial service might be used, in which case multiple upgrades to higher levels of service could be offered and selected as part of the method according to the invention. It is accordingly intended that the appended claims shall cover all such changes in form, details and applications which do not depart from the true spirit and scope of the invention.

What is claimed as new and desired to be secured by Letters Patent of the United States is:

1. In a telecommunication system, an apparatus for selectively controlling a telephone call, comprising:

means for determining if a call gapping control is active for the present telephone call:

means responsive to said determining means for obtaining level of service information which is associated with an ANI of the present telephone call if said call gapping control is active; and means for applying said call gapping control to either allow the telephone call to be completed or terminate the telephone call based on the level of service if said call gapping control is active for the present telephone call;

wherein the probability of completing the call while said call gapping control is active increases as the level of service of the call increases.

2. The apparatus as set forth in claim 1, further comprising means for completing the telephone call if said call gapping control is not active.

3. An apparatus as set forth in claim 1, further comprising:

means for completing the telephone call if the call is allowed to be completed;

means for announcing to the caller that the telephone call will not be completed; and means for terminating the telephone call if the call is to be terminated.

4. A method for call gapping a telephone call comprising the steps of:

a. collecting called number;

b. determining if call gapping is active for the telephone call and if call gapping for the telephone call is not active proceeding to step r, while if call gapping is active for the telephone call proceeding to step c;

c. determining if originator's NM LOS is in signaling data and if it is, proceeding to step d, otherwise proceeding to step e;

d. obtaining NM LOS from said signaling data and proceeding to step o;

e. determining if ANI is available for this call and if ANI is not available proceeding to step f and if ANI is available proceeding to step g;

f. determining if calling number is available and if it is not available proceeding to step o, while if it is available proceeding to step g;

g. accessing originating NM LOS table;

h. determining from ANI or calling number if this telephone call matches a number code in originating NM LOS table and if there is not a match proceeding to step m, while if there is a match proceeding to step o;

i. determining if use of line data is required to obtain NM LOS according to originating NM LOS table and if it is required, proceeding to step i, while if it is not required, proceeding to step j, j. obtaining NM LOS from line data and proceeding to step o;

k. determining if query of an SCP database is required to obtain NM LOS according to originating NM LOS table and if a query is required proceeding to step l, while if a query is not required proceeding to step n;

l. querying SCP database with either ANI or calling number to obtain a match in the SCP database and if a match is found obtaining the NM LOS from the SCP database and proceeding to step o, while if a match is not found proceeding to step m;

m. assigning a default network management LOS to this call and proceed to step o;

n. retrieving NM LOS from originating NM LOS table for this ANI or calling number;

o. determining if call gapping is active and if call gapping is not active proceeding to step r and if call gapping is active proceeding to step p;

p. applying a level of call gapping based upon called number and NM LOS and determining if this call is allowed to be completed;

q. if the call is not allowed to be completed, routing call to an announcement; and r. if the call is allowed to be completed, routing call to its destination.

5. The method as set forth in claim 4, wherein the rate of call gapping is different for different levels of service.

6. The method as set forth in claim 4, wherein the rate of call gapping is different for different calling numbers.

7. The method as set forth in claim 4, wherein the rate of call gapping is different, based upon a portion of each calling number.

8. The method as set forth in claim 4, wherein said announcement of step r further comprises the steps of:

s. if a higher level of service is available to the calling party which has a greater chance of completing the call, announcing to the originator that the circuits are busy for the call's present NM LOS and offering to increase the call's NM LOS and thereby the chances of completing the call for an extra fee if the calling party accepts by pressing a specific key of a keypad of the originating telephone station; and t. if the calling party accepts the offer to an increase in NM LOS, increasing the NM LOS for the call and returning to step p and if the call is completed with the increased NM LOS charging the extra fee to the originating party's account.

9. A method for using a trunk group control to manage a telephone call comprising the steps of:

a. collecting a called number of this call;

b. determining a trunk group for communicating this call;

c. determining if a trunk group control is active for a trunk group communicating the telephone call and if a trunk group control is not active proceeding to step n, while if a trunk group control is active proceeding to step d;

d. determining if ANI is available for this call and if ANI is not available proceeding to step e and if ANI is available proceeding to step f;

e. determining if calling number is available and if it is not available proceeding to step m, while if it is available proceeding to step f;

f. obtaining NM LOS for this call;

g. determining from ANI or calling number if this telephone call matches a number code and if there is a not a match proceeding to step m, while if there is a match proceeding to step h;

h. determining if query of an SCP database is required to obtain NM LOS and if a query is required proceeding to step i, while if a query is not required proceeding to step l;

i. querying SCP database with either ANI or calling number to obtain NM LOS;

j. determining if the query is successful in finding a match in the SCP database and if a match is found obtaining the NM LOS from the SCP database and proceeding to step m, while if a match is not found proceeding to step k;

k. assigning a default NM LOS to this call and proceed to step m;

l. obtain NM LOS from a LOS table for this ANI or calling number;

m. applying a trunk group control based upon NM LOS and determining if this call is allowed to be completed; and n. if the call is allowed to be completed routing the call to its destination and if the call is not allowed to be completed, routing the call to an announcement.

10. The method as set forth in claim 9, wherein the trunk group control applied in step m is a skip control which allows the call to be completed by skipping from a primary trunk group to a first alternative route within a normal routing pattern.

11. The method as set forth in claim 10, wherein the rate of skipping is different for different calling numbers.

12. The method as set forth in claim 10, wherein the rate of skipping is different for different calling number portions.

13. The method as set forth in claim 9, wherein step m of applying a trunk group control based upon called number and network management LOS and determining if this call is allowed to be completed further comprises the step of:

if the call is not allowed to be completed, canceling the call and proceeding to step n.

14. The method as set forth in claim 13, wherein the rate of cancellation is different for different levels of service.

15. The method as set forth in claim 13, wherein the rate of cancellation is different for different calling numbers.

16. The method as set forth in claim 13, wherein the rate of cancellation is different for different calling number portions.

17. The method as set forth in claim 9, wherein the trunk group control applied in step m is a re-route control which allows the call to be completed by re-routing from a primary trunk group to an unusual alternative route from a normal routing pattern.

18. The method as set forth in claim 17, wherein the rate of re-routing is different for different levels of service.

19. The method as set forth in claim 17, wherein the rate re-routing is different for different calling numbers.

20. The method as set forth in claim 17, wherein the rate of re-routing is different for different calling number portions.

21. A method for call gapping a telephone call comprising the steps of:

a. collecting called number;

b. determining if call gapping is active for the telephone call and if call gapping for the telephone call is not active proceeding to step r, while if call gapping is active for the telephone call proceeding to step c;

c. determining if originator's NM LOS is in signaling data and if it is, proceeding to step d, otherwise proceeding to step e;

d. obtaining NM LOS from said signaling data and proceeding to step o;

e. determining if ANI is available for this call and if ANI is not available proceeding to step f and if ANI is available proceeding to step g;

f. determining if calling number is available and if it is not available proceeding to step o, while if it is available proceeding to step g;

g. accessing originating NM LOS table;

h. determining from ANI or calling number if this telephone call matches a number code in originating NM LOS table and if there is not a match proceeding to step m, while if there is a match proceeding to step o;

i. determining if use of line data is required to obtain NM LOS according to originating NM LOS table and if it is required, proceeding to step i, while if it is not required, proceeding to step j;

j. obtaining NM LOS from line data and proceeding to step o;

k. determining if query of an SCP database is required to obtain NM LOS according to originating NM LOS table and if a query is required proceeding to step l, while if a query is not required proceeding to step n;

l. querying SCP database with either ANI or calling number to obtain a match in the SCP database and if a match is found obtaining the NM LOS from the SCP database and proceeding to step o, while if a match is not found proceeding to step m;

m. assigning a default network management LOS to this call and proceed to step o;

n. retrieving NM LOS from originating NM LOS table for this ANI or calling number;

o. determining if call gapping is active and if call gapping is not active proceeding to step r and if call gapping is active proceeding to step p;

p. applying a level of call gapping based upon called number and NM LOS and determining if this call is allowed to be completed;

q. if the call is not allowed to be completed, routing call to an announcement;

r. if the call is allowed to be completed, routing call to its destination;

s. if a higher level of service is available to the calling party which has a greater chance of completing the call, announcing to the originator that the circuits are busy for the call's present NM LOS and offering to increase the call's NM LOS and thereby the chances of completing the call if the calling party accepts by pressing a specific key of a keypad of the originating telephone station; and t. if the calling party accepts the offer to an increase in NM LOS, increasing the NM LOS for the call and returning to step p and if the call is completed with the increased NM LOS recording the upgrade in the originating party's records.

* * * * *